United States Patent [19]

Matsuo et al.

[11] Patent Number: 5,001,553
[45] Date of Patent: Mar. 19, 1991

[54] LUMINANCE SIGNAL/COLOR SIGNAL SEPARATION CIRCUIT

[75] Inventors: Yasutoshi Matsuo, Kawasaki; Hiroshi Yamada, Yokohama, both of Japan

[73] Assignee: Victor Company of Japan, Ltd., Yokohama, Japan

[21] Appl. No.: 310,559

[22] Filed: Feb. 15, 1989

[30] Foreign Application Priority Data

Feb. 15, 1988 [JP] Japan ............................ 63-30811
Feb. 16, 1988 [JP] Japan ............................ 63-33637
Feb. 16, 1988 [JP] Japan ............................ 63-33638
Feb. 16, 1988 [JP] Japan ............................ 63-33639

[51] Int. Cl.⁵ .......................................... H04N 9/78
[52] U.S. Cl. .................................. 358/31; 358/36
[58] Field of Search ............................ 358/31, 36

[56] References Cited

U.S. PATENT DOCUMENTS

| | | |
|---|---|---|
| 4,050,084 | 9/1977 | Rossi . |
| 4,489,346 | 12/1984 | Tanaka et al. . |
| 4,524,382 | 6/1985 | Tanaka et al. ............ 358/31 |
| 4,851,898 | 7/1989 | Asahara ..................... 358/31 |
| 4,916,327 | 4/1990 | Matsuo ....................... 358/31 |
| 4,920,408 | 4/1990 | Umezawa .................. 358/31 |

FOREIGN PATENT DOCUMENTS 0173439 3/1986 European Pat. Off. ............... 358/31
0329382 8/1989 European Pat. Off. .

Primary Examiner—Howard W. Britton
Assistant Examiner—Michael Lee
Attorney, Agent, or Firm—Fleit, Jacobson, Cohn, Price, Holman & Stern

[57] ABSTRACT

A luminance signal/color signal separation circuit includes a band-pass filter for picking up a color signal from a composite image signal; a delay circuit for sequentially delaying by one line the color signal picked up by the band-pass filter and obtaining three past, present and future line information; a first operation circuit for outputting a signal which takes a value having a larger absolute value when the past and future line information have the same sign, and takes an algebraic sum of the past and future line information when the past and future line information have different signs; a second operation circuit for outputting a signal which takes a value having a smaller absolute value when the output from the first operation circuit and the present line information have the same sign, and takes a reference value when the output from the first operation circuit and the present line information have different signs; and a third operation circuit for obtaining a color signal by subtracting the output from the second operation circuit from the present line information.

7 Claims, 17 Drawing Sheets

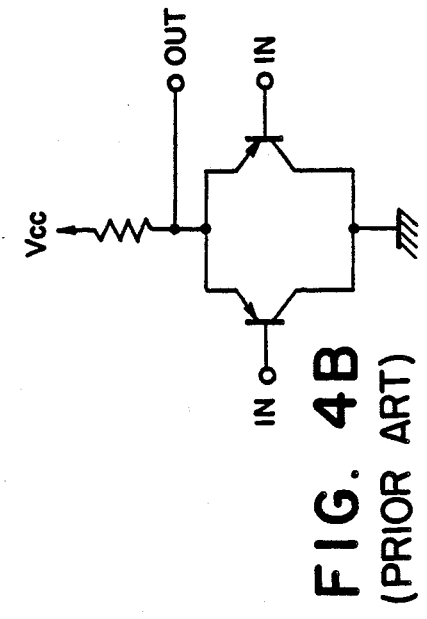
FIG. 4A
(PRIOR ART)
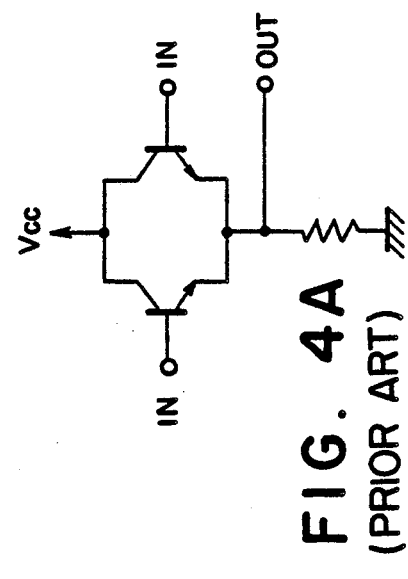
FIG. 4B
(PRIOR ART)
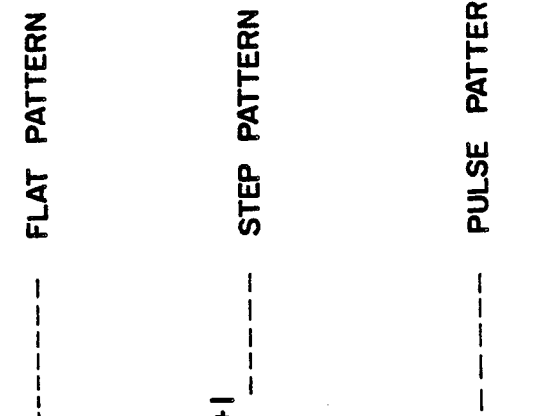
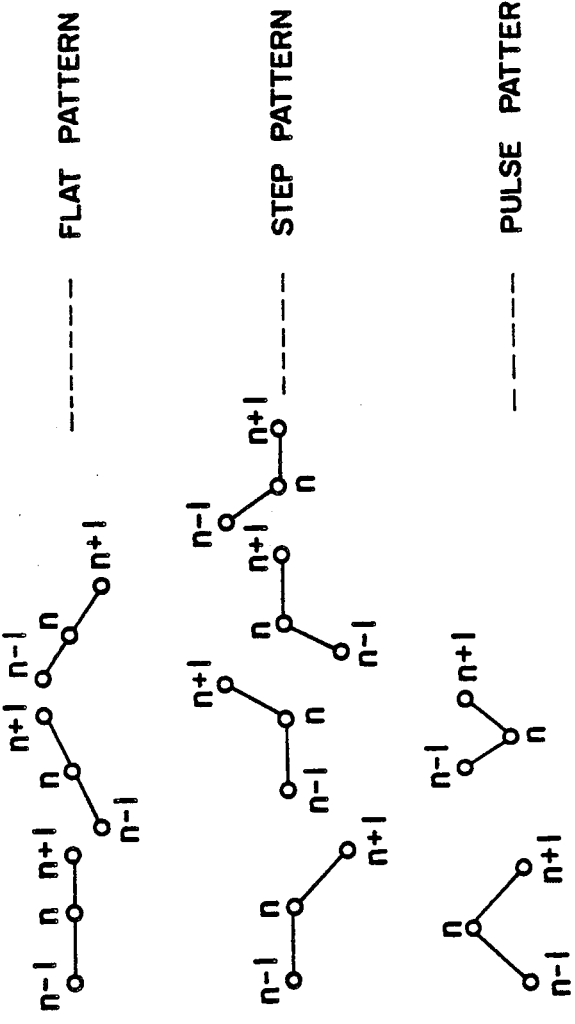
FIG. 5A
(PRIOR ART)
FIG. 5B
(PRIOR ART)
FIG. 5C
(PRIOR ART)

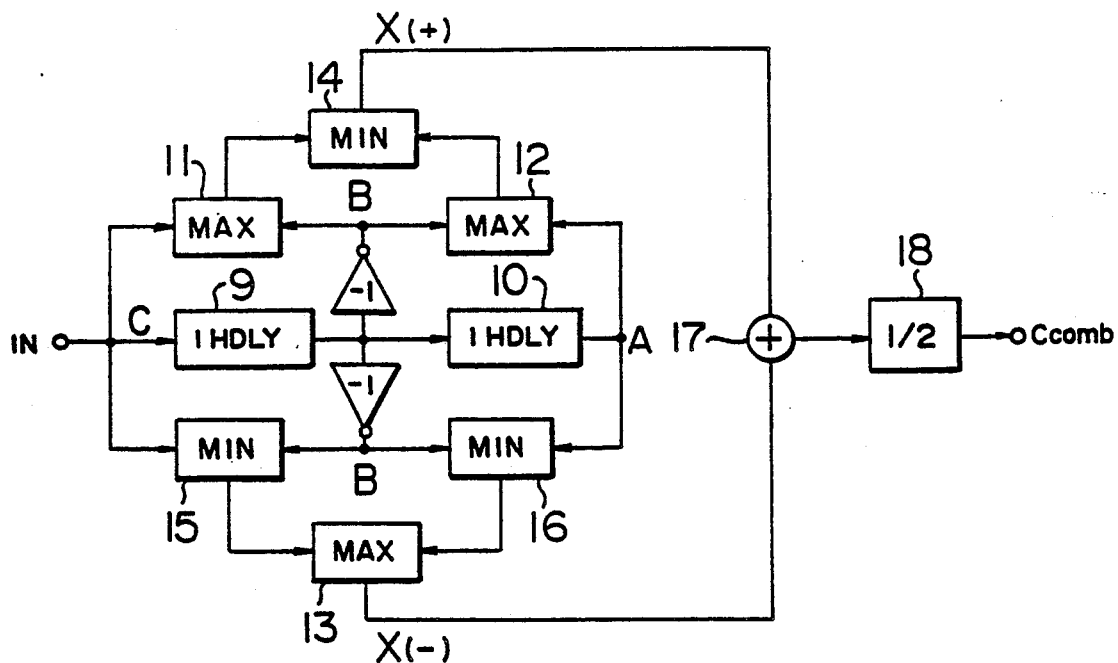
$X(+) = MIN(MAX(C,B), MAX(B,A))$
$X(-) = MAX(MIN(C,B), MIN(B,A))$
$Ccomb = (X(+) + X(-))/2$
FIG. 6
(PRIOR ART)
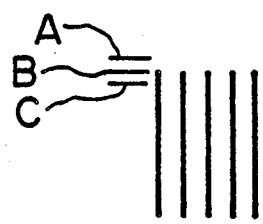 
FIG. 8A　　　　FIG. 8B
(PRIOR ART)　　(PRIOR ART)
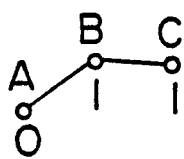 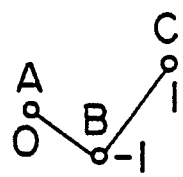
FIG. 9A　　　　FIG. 9B
(PRIOR ART)　　(PRIOR ART)

| V1 | V2 | V3 | FG | YH | Ccout | Ycout | CONVENTIONAL CIRCUIT OF FIG. 3 |
|---|---|---|---|---|---|---|---|
| ○ | ○ | ○ | ○ | ○ | ○ | ○ | |
| ○ | ○ | − | − | ○ | ○ | ○ | |
| − | ○ | ○ | − | ○ | ○ | ○ | |
| − | ○ | − | ○ | ○ | ○ | ○ | Y, C 1/2  *1 |
| − | ○ | − | ○ | ○ | ○ | ○ | |
| ○ | − | ○ | − | ○ | − | ○ | Y, C 1/2  *2 |
| ○ | − | − | − | − | ○ | − | Y, C 1/2  *3 |
| ○ | − | ○ | − | ○ | − | ○ | |
| − | − | ○ | − | ○ | − | ○ | Y, C 1/2  *4 |
| − | − | − | − | − | ○ | − | |
| − | − | − | ○ | ○ | − | ○ | |
| − | − | − | ○ | ○ | − | ○ | |
| − | − | − | − | ○ | − | ○ | |

FIG. 11

| A | B (−B) | Cw | Yh | Cw+Yh | Cn | Cout | Yout |
|---|---|---|---|---|---|---|---|
| 0 | 0 (0) | 0 | 0 | 0 | 0 | 0 | 0 |
| 0 | 1 (−1) | 0 | 0 | 0 | 0 | 0 | 0 |
| 1 | 0 (0) | 0 | 0 | 0 | 1 | 1(N) | 0 *6 |
| 1 | 1 (−1) | 0 | 1 | 1 | 0 | 0 | 1 *7 |
| 1 | −1 (1) | 1 | 0 | 1 | 0 | 1(W) | 0 *5 |

FIG. 16

LUMINANCE SIGNAL/COLOR SIGNAL SEPARATION CIRCUIT

BACKGROUND OF THE INVENTION

This invention relates to a luminance signal/color signal separation circuit (hereinafter called a Yc separation circuit) for separating Yc (luminance) signal and Cc (carrier chrominance) signal from a composite video signal to take them out, e.g., in VTR, etc.

FIG. 1 shows a generally used C signal comb filter circuit. A video signal incoming to a terminal 1 is passed through a 1H delay circuit and a subtracter, and through a comb filter which passes all the frequency components of the video signal. The bandwidth of the video signal thus supplied is then limited at the following band-pass filter BPF and outputted as a chrominance signal.

It is preferable that the bandwidth of a comb filter used for Yc separation be wide for a C signal having a large level such as a color bar signal from the standpoint of resolution, and narrow for a C signal having a small level such as a signal for scenery from the standpoint of cross color (due to this, the image is unnecessarily colored). To match both the contradictory cases, the bandwidth of a comb filter has generally been set at about 500 KHz to 1 MHz in practice.

Generally, a Yc separation circuit cannot provide a perfect separation function so that when a signal for oblique lines as shown in FIG. 2 is incoming to the circuit shown in FIG. 1, a low level C signal is taken out therefrom instead of an essential Y signal. This low level C signal is called cross color. Such cross color cannot be fully eliminated although it depends on the bandwidth of the comb filter. And, there occurs a problem that the narrower the bandwidth of the comb filer is made, the more the filter characteristic is degraded.

FIG. 3 is a block diagram showing an example of a conventional Yc separation circuit. A composite video signal (e.g., color bar signal) incoming to a terminal 1 passes through a band-pass filter 2 and a filter circuit 3 described later and is taken out from a terminal 4 as a Cc signal. The composite video signal also passes through a Δt delay circuit 5 and a 1H delay circuit 6 and is added to the Cc signal at an adder 7. This Yc separation circuit utilizes a vertical correlation between video signals. A conventional comb filter has used a vertical correlation between two lines (present line information, and 1H past line information), whereas this circuit uses a vertical correlation among three lines (present line information, 1H past line information, and 1H future line information).

In the filter circuit 3, the three types of line information are represented by A, B and C, respectively, where A (past) is an input signal to the filter circuit 3, B (present) is an output from 1H delay circuit 9, and C (future) is an output from the 1H delay circuit 10. In FIG. 3, reference numerals 11, 12 and 13 represent high potential detection circuits (hereinafter called MAX) each of which is constructed as shown in FIG. 4A for outputting a higher potential signal between the two signals inputted thereto, whereas reference numerals 14, 15 and 16 represent low potential detection circuits (hereinafter called MIN) each of which is constructed as shown in FIG. 4B for outputting a lower potential signal between the two signals inputted thereto.

Three line video signals of the NTSC system in the vertical direction of a screen can be classified into three patterns including a flat pattern shown in FIG. 5A, a step pattern shown in FIG. 5B, and a pulse pattern shown in FIG. 5C. In FIGS. 5A to 5C, n represents a point (present) on the arbitrary line of a raster, (n−1) represents a point (past) on the just previously scanned line, and (n+1) represents a point (future) on the line scanned next. If a vertical correlation is present among Cc signals, for example, which are modulated on a subcarrier having a frequency $f_{SC}=(455/2)f_H$ where $f_H$ is a horizontal scanning frequency, then a pulse pattern shown in FIG. 5C which alternately changes at each line is obtained. This pulse pattern cannot be obtained through a conventional comb filter using two lines.

The fundamental operation of the filter circuit shown in FIG. 3 will be described with reference to FIG. 6. MAX 11 outputs a higher potential signal between signals C and B, MAX 12 outputs a higher potential signal between signals B and A, and MIN 14 outputs a lower potential signal X(+) between the outputs from MAX 11 and MAX 12, the signal X(+) being represented by MIN (MAX (C, B), MAX (B, A)). Similarly, MIN 15 outputs a lower potential signal between signals C and B, MIN 16 outputs a lower potential signal between signals B and A, and MAX 13 outputs a higher potential signal X(−) between the outputs from MIN 15 and MIN 16, the signal X(−) being represented by MAX (MIN (C, B), MIN (A, C)). The signals X(+) and X(−) are added together at the adder 17 and divided by ½ at a ½ circuit 18 to obtain a signal Cc=(X(+)+X(−))/2. Since the signal Cc is obtained first in this circuit, the inverted present line signal is used for the above operation.

The output of the filter circuit 3 is therefore represented by a formula (B+MID (A, B, C,))/2, where MID (A, B, C) represents the second highest level signal among the three inputted signals A, B and C. Resultant Cc signals for the four patterns shown in FIGS. 7A to 7D take values as indicated at the right side column.

With the conventional circuit shown in FIG. 3, however, there is a problem that when a vertically striped image like multi bursts with repeated black and white as shown in FIG. 8A is displayed, there occurs cross colors at the upper and lower ends of the image, and shading of Yc signal, respectively as shown in FIG. 8B. In particular, if the vertically striped image is present below B as shown in FIG. 8A, the signals of the three line information at the upper ends become A=0, B=C=1 so that with signal B inverted for generating Cc signal, the resultant signals become A=0, B=−1, and C=1 as shown in FIG. 9B. Using the output formula of (B+MID (A, B, C))/2, the Cc signal becomes (B+A)/2=−½ so that the image is unnecessarily colored (cross colored). In addition, the Yc signal becomes 1−(½)=½ so that the amplitude thereof is halved, thus posing a problem of shading.

In order to solve the above problems, the present applicant filed a Japanese Patent Application entitled "Yc separation circuit" on Oct. 22, 1987. According to this circuit, obtained first is a mean value signal of past line information and future line information. If the mean value signal and a color signal with unnecessary signal components have the same sign, a lower level signal is selected, whereas if both signals have a different sign, a zero level signal is selected irrespective of the color signal level. Then, the color signal with unnecessary signal components is subtracted by the smaller level signal or the zero level signal to thus obtain a color signal with less unnecessary signal components.

SUMMARY OF THE INVENTION

It is therefore an object of the present invention to provide a Yc separation circuit capable of eliminating cross color even for an image of oblique lines.

It is another object of the present invention to provide a Yc separation circuit capable of obtaining a high quality image without cross colors at the upper and lower end of a screen, and without shading of Yc signal.

According to the present invention, there is provided a luminance signal/color signal separation circuit comprising a band-pass filter for picking up a color signal from a composite image signal; a delay circuit for sequentially delaying by one line the color signal picked up by the band-pass filter and obtaining three past, present and future line information; a first operation circuit for outputting a signal which takes a value having a larger absolute value when the past and future line information have the same sign, and takes an algebric sum of the past and future line information when the past and future line information have different signs; a second operation circuit for outputting a signal which takes a value having a smaller absolute value when the output from the first operation circuit and the present line information have the same sign, and takes a reference value when the output from the first operation circuit and the present line information have different signs; and a third operation circuit for obtaining a color signal by subtracting the output of the second operation circuit from the present line information.

According to the present invention, there is also provided a luminance signal/color signal separation circuit comprising a wide band-pass filter for picking up a color signal from a composite image signal; a delay circuit for sequentially delaying by one line the color signal picked up by the wide band-pass filter and obtaining three past, present and future line information; a first operation circuit for outputting a signal which takes a value having a larger absolute value when the past and future line information have the same sign, and takes an algebraic sum of the past and future line information when the past and future line information have different signs; a second operation circuit for outputting a signal which takes a value having a smaller absolute value when the output from the first operation circuit and the present line information have the same and sign, and takes a reference value when the output from the first operation circuit and the present line information have different signs; a third operation circuit for obtaining a color signal by subtracting the output of the second operation circuit from the present line information; a fourth operation circuit for detecting a signal having a strongest vertical correlation among the past, present and future line information; and a fifth operation circuit for outputting a color signal by adding the output of the fourth operation circuit to a signal which is obtained by subtracting the output of the fourth operation circuit from the output from the third operation circuit and by passing the result through a narrow band-pass filter.

BRIEF DESCRIPTION OF THE DRAWINGS

In the accompanying drawings:

FIGS. 4A and 4B are circuit diagrams of MAX and MIN circuits, respectively;

FIGS. 5A to 5C show patterns obtained by using three lines;

FIG. 6 is a block diagram for explaining a conventional filter circuit;

FIGS. 8A and 8B illustrate multi burst images;

FIGS. 9A and 9B illustrate patterns obtained by the circuit shown in FIG. 6;

FIG. 11 illustrates signals obtained by the circuit shown in FIG. 10;

FIG. 16 illustrates signals obtained by the circuit shown in FIG. 15;

DESCRIPTION OF THE PREFERRED EMBODIMENTS

Figure 3:
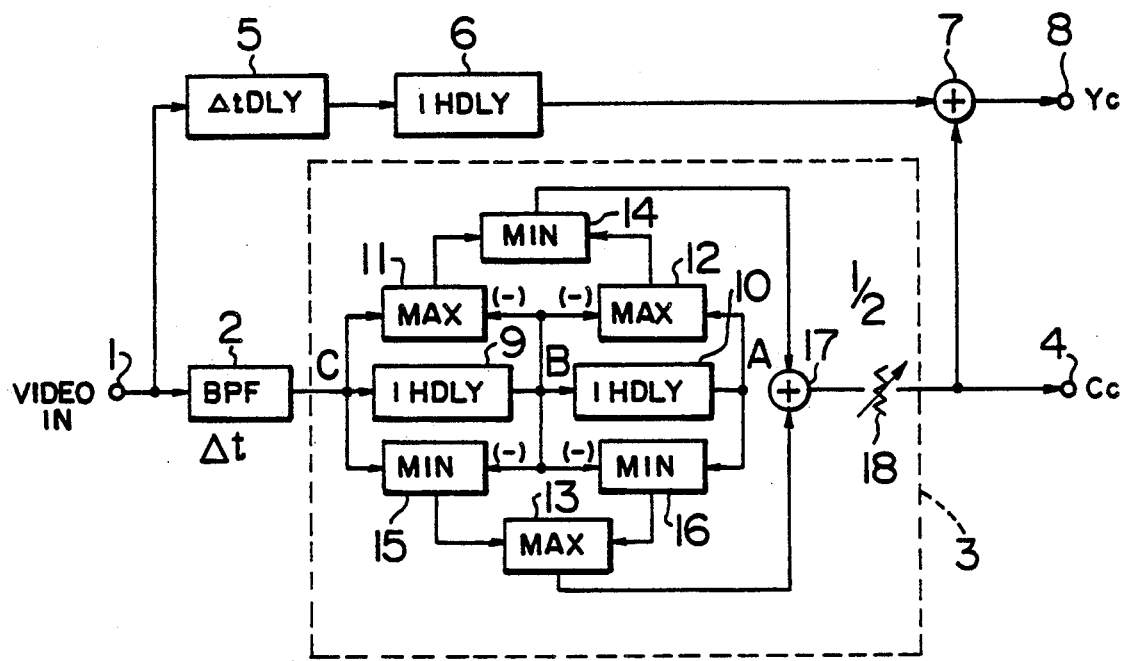
FIG. 3 is a block diagram of a conventional Yc separation circuit.
Figure 7A:
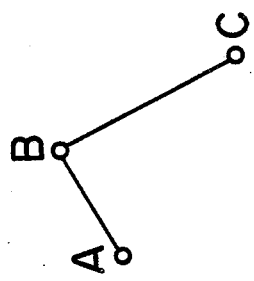
FIGS. 7A to 7D illustrate Cc signals obtained by the circuit shown in FIG. 6.
Figure 7B:
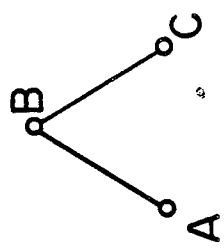
Figure 7C:
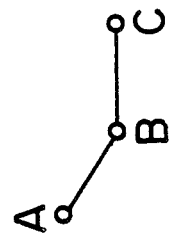
Figure 7D:
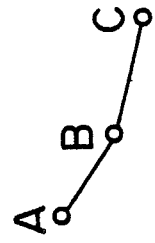
Figure 10:
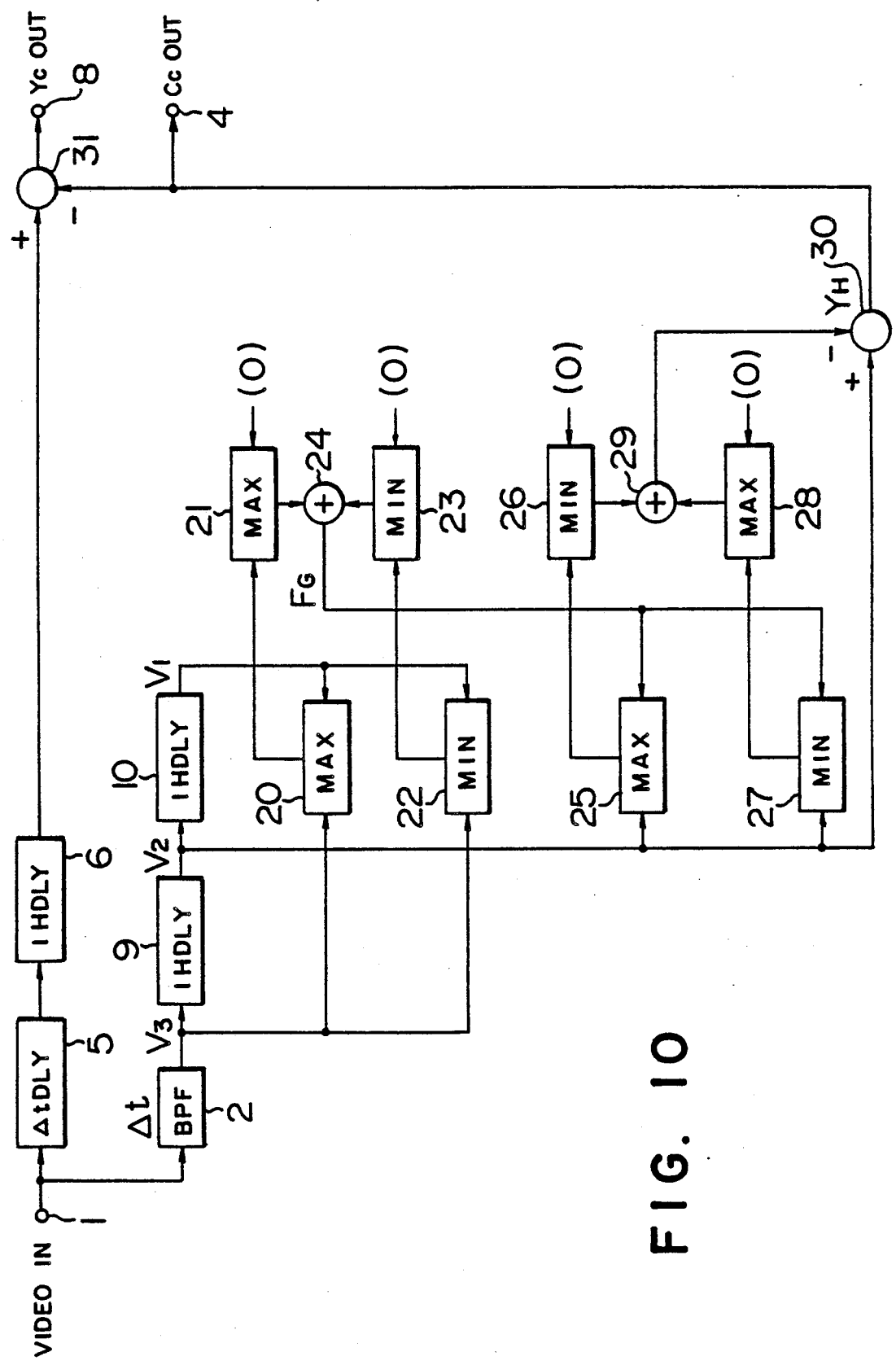
FIG. 10 is a block diagram of a first embodiment of the Yc separation circuit of this invention.

FIG. 10 is a block diagram showing a first embodiment of the Yc separation circuit according to the present invention, wherein elements similar to those shown in FIG. 3 are represented by using identical reference numerals and labels, and the description therefor is omitted.

Referring to FIG. 10, a higher potential signal between signals V1 and V3 is picked up by MAX 20, and the signal is compared with zero by MAX 21 to pick up a higher potential signal therebetween. Similarly, a lower potential signal between signals V1 and V3 is picked up by MIN 22, and the signal is compared with zero to pick up a lower potential signal therebetween. The output signals from MIN 23 and MAX 21 are added together at an adder 24 to obtain a signal FG.

The signal FG is thus obtained by a first operation circuit whereby the signal takes a value having a larger absolute value when past and future line information have the same sign, and takes an algebraic sum of them when they have different signs.

A higher potential signal between signal V2 and signal FG is picked by MAX 25, and the signal is compared with zero by MIN 26 to obtain a lower potential signal therebetween. Similarly, a lower potential signal between signal V2 and signal FG is picked up by MIN 27, and the signal is compared with zero by MAX 28 to obtain a higher potential signal therebetween. The output signals from MAX 28 and MIN 26 are added together at an adder 29 to obtain a signal YH.

The signal YH is thus obtained by a second operation circuit, whereby the signal takes a value having a smaller absolute value when the output from the first operation circuit and the current line information have the same sign, and takes a value equal to zero when they have different signs.

Signal V2 is subtracted by signal YH at a subtracter 30 to take out the result from an output terminal 4 as signal Cc. Meanwhile, an output from a 1H delay circuit is subtracted by signal Cc at a subtracter to take out the result from an output terminal 8 as signal YC.

Patterns for signals V1, V2 and V3 with various combinations of "0", "1" and "−1" as shown in FIG. 5 are shown in FIG. 11 with respect to signals FG, YH, CC, and YC.

As shown for example at line *1 in FIG. 11, for a pulse pattern with $V1=1$, $V2=0$, and $V3=1$ (it is reasonable to consider that in case of the pattern with past, present, and future line information of 1, 0, and 1, signal C is currently not present and signal CC or zero level is desirable to be outputted), the conventional circuit shown in FIG. 3 outputs signal CC of $\frac{1}{2}$ level resulting in cross color, whereas the present invention circuit outputs a zero level signal without generating cross color. As shown at line *2 in FIG. 11, for a pulse pattern with $V1=V3=0$, and $V2=1$ (it is reasonable to consider that in case of the pattern with past, present and future line information of 0, 1, and 0, signal C is currently present and signal CC of 1 level is desirable to be outputted), the conventional circuit shown in FIG. 3 outputs signal CC of $\frac{1}{2}$ level resulting in shading, whereas the present invention circuit outputs a 1 level signal without generating shading.

As shown at line *3 in FIG. 11, for a step pattern with $V1=0$, $V2=V3=1$, and at line *4 for a step pattern $V1=V2=1$, and $V3=0$, (it is desirable to output signal CC of zero level for both patterns like multi burst signals), the conventional circuit outputs signal CC of $\frac{1}{2}$ level resulting in cross color, whereas the present invention circuit outputs a zero level signal without generating cross color. Also, the conventional circuit outputs signal Yc of $\frac{1}{2}$ level, whereas the present invention circuit outputs signal YC of 1 level without generating shading.

The patterns other than at lines *1 to *4 are the same as the conventional circuit.

As above, the embodiment can obtain a high quality image without cross color at the upper and lower ends of a screen and without shading of YC signal contrary to the conventional circuit, in the case of displaying vertically striped multi bursts with repeated black and white (step pattern), and without cross color, shading and the like in CC signal, when pulse patterns are displayed.

Meanwhile, with the circuit shown in FIG. 10, for an image without vertical correlation, signal C is outputted as if it passed through a band-pass filter, and signal Y is outputted as if it passed through a band-elimination filter. In this case, the bandwidth is determined based on that of the band-pass filter 2. On the other hand, for an image with vertical correlation, both signal C and signal Y are outputted as if they passed a comb filter. Also in this case, the bandwidth is determined based on that of the band-pass filter 2. Thus, the bandwidth of C and Y signals to be separated depends on the bandwidth of the band-pass filter 2 for both the cases with and without vertical correlation.

However, the circuit shown in FIG. 10 is associated with some problems. Namely, with the bandwidth of the band-pass filter 2 being set relatively wide, cross luminance (dots generated at the boundary between color bars) is not generated for an image such as color bars with vertical correlation, and the frequency characteristic of C signal is fairly good, but shading is generated for a random image (relatively low level of C signal as compared with a color bar) such as an ordinary outdoor scenery without vertical correlation. Conversely, with the bandwidth of the band-pass filter 2 being set relatively narrow, shading is not generated for an image without vertical correlation, but cross luminance is generated for an image with vertical correlation, and the frequency characteristic of C signal is degraded.

Figure 12:
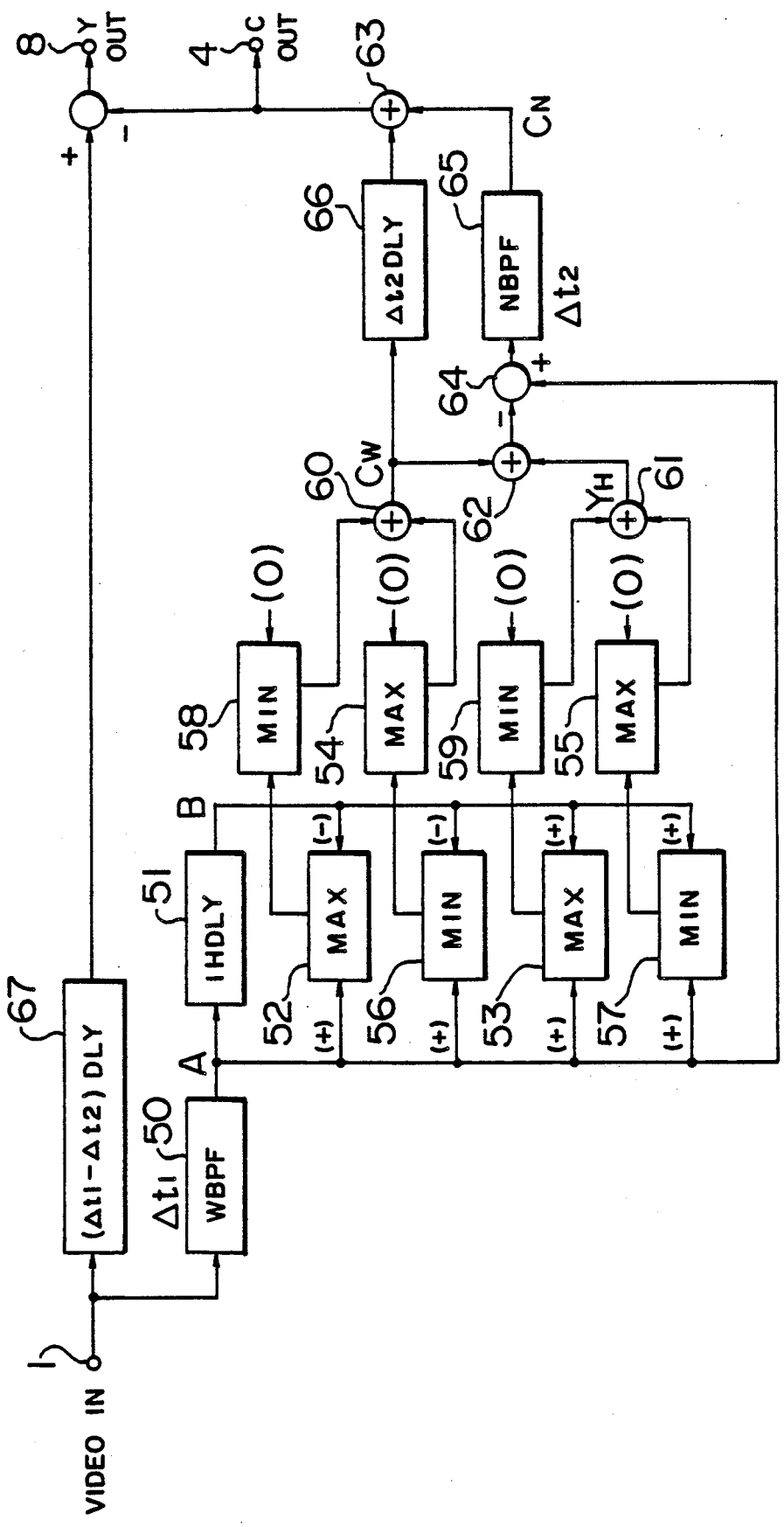
FIG. 12 is a block diagram of the circuit which the applicant proposed.

FIG. 12 is a circuit diagram disclosed in Japanese Patent Application No. 62-265885 filed by the present applicant.

According to this circuit, a composite image signal is separated by a wide band-pass filter 50 into a color signal and a high frequency Y signal which are processed in the circuit constructed of a 1H delay circuit 51, MAXs 52 to 55, MINs 56 to 59, adders 60 to 63, subtracter 64, delay circuit 66 and narrow band-pass filter 65, for discrimination between the cases with and without vertical correlation. For the case with vertical correlation, the color signal is picked up as having a wide frequency band, whereas for the case without vertical correlation, the color signal is picked up as having a narrow frequency band.

Figures 13, 14:
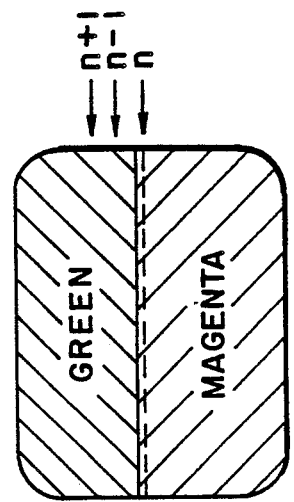
FIG. 13 illustrates signals obtained by the circuit shown in FIG. 12.
FIG. 14 illustrates an image where the color hues are inverted.

According to this circuit, as shown in FIG. 13, for an image such as color bars with vertical correlation, a wide band color signal CW of lever 1 is outputted, while a high frequency band signal YH of level 0 is outputted and a narrow band color signal CN of level 0 is outputted as the color signal C (line *5). Alternatively, for a fine image such as an ordinary outdoor scenery without vertical correlation, a wide band color signal CW of level 0 is outputted and a high frequency band signal YH also of level 0 is outputted, while a narrow band color signal CN is outputted as the color signal C (line *6). As above, the optimum bandwidth can be selected depending upon whether vertical correlation is present or not.

The circuit shown in FIG. 12 is however unsatisfactory for an image having inverted color hues of green and magenta in the vertical direction of a screen. Specifically, assuming that two 1H delay lines are provided behind the wide band-pass filter 50 shown in FIG. 12 and n represents a present line, (n−1) represents a line one line before a present line, and (n−2) represents a line two lines before the present line, then it becomes that $n=1$, $(n-1)=1$, and $(n-2)=-1$ for an image without vertical correlation as shown in FIG. 14. However, the actual circuit shown in FIG. 12 has only a single 1H delay circuit so that information on only two lines n and (n−1) are obtained. Consequently, it is not possible to discriminate among the case of $n=1$, $(n-1)=1$, and $(n-2)=0$, the case of $n=1$, $(n-1)=1$, and $(n-2)=1$, and the case of $n=1$, $(n-1)=1$, and $(n-2)=-1$. In all of the cases, Cout=0 and Yout=1 are outputted (line *7 of FIG. 13).

Therefore, in displaying an image whose color hues invert in the vertical direction of a screen (n=1, (n−1)=1, and (n−2)=−1), a color signal is erroneously mixed with Y signal so that dot crawl is generated at the boundary between green and magneta, and color information is lost.

Figure 15:
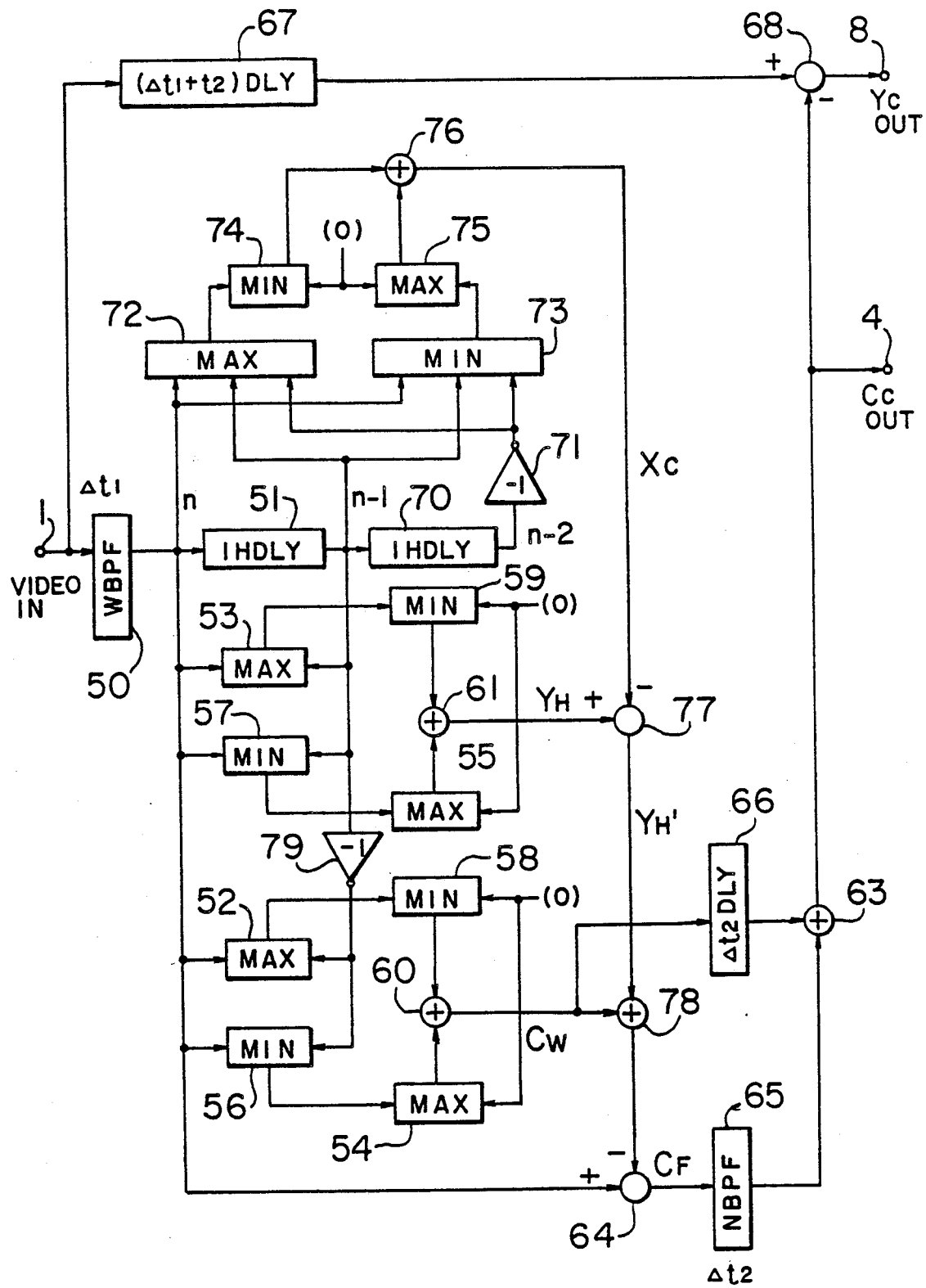
FIG. 15 is a block diagram of a second embodiment of the Yc separation circuit of this invention.

FIG. 15 is a block diagram of a second embodiment (non-average type comb filter) of this invention which solves the above problems, wherein similar elements to those shown in FIG. 12 are represented by using identical reference numerals and labels. Referring to FIG. 15, supplied to MAX 72 and MIN 73 are an output signal n (present line) from a wide band-pass filter 50 having a bandwidth of 3.58 MHz±1.5 MHz, an output signal (n−1) (one line before) from a 1H delay circuit 51, and an inverted signal of an output signal (n−2) (two lines before) from a 1H delay circuit 70. MAX 72 and MIN 73 pick up the highest and lowest potential signals, respectively. An output from MAX 72 is compared with a reference potential (0 in this embodiment) by MIN 74 to output a lower potential signal therebetween, whereas an output from MIN 73 is compared with a reference potential (0 in this embodiment) by MAX 75 to output a higher potential signal therebetween. The outputs from MAX 75 and MIN 74 are added together at an adder 76 to supply the result to a subtracter 77 as a signal Xc. A signal YH outputted from an adder 61 is subtracted by the signal XC from the adder 76 to output the result as a signal YH′.

A signal CW outputted from an adder 60 is added to the signal YH′ by an adder 78 the result of which is subtracted from an output from the wide band-pass filter 50. The signal CW is also supplied to a Δt2 delay circuit 66.

An inverter 79 inverts an output from the 1H delay circuit 51, and the inverter 79 performs the similar function to that an output from the 1H delay circuit 51 of FIG. 12 is inverted and supplied to MAX 52 and MIN 56.

The signal CF from the subtracter 64 is supplied to an adder 63 via a narrow band-pass filter 65 having a bandwidth of 3.58 MHz±0.5 MHz, to be added to an output from the delay circuit 66 the result of which is taken out from an output terminal 4 as an CC signal.

In the meantime, a composite image signal incoming to an input terminal 1 passes through a (Δt1+Δt2) delay circuit 67 for delay of a total delay time of the wide band-pass filter 50 and narrow band-pass filter 65, and is supplied to a subtracter 68 whereat it is subtracted by the signal CC to be outputted from an output terminal 8 as a YC signal.

Figure 16:
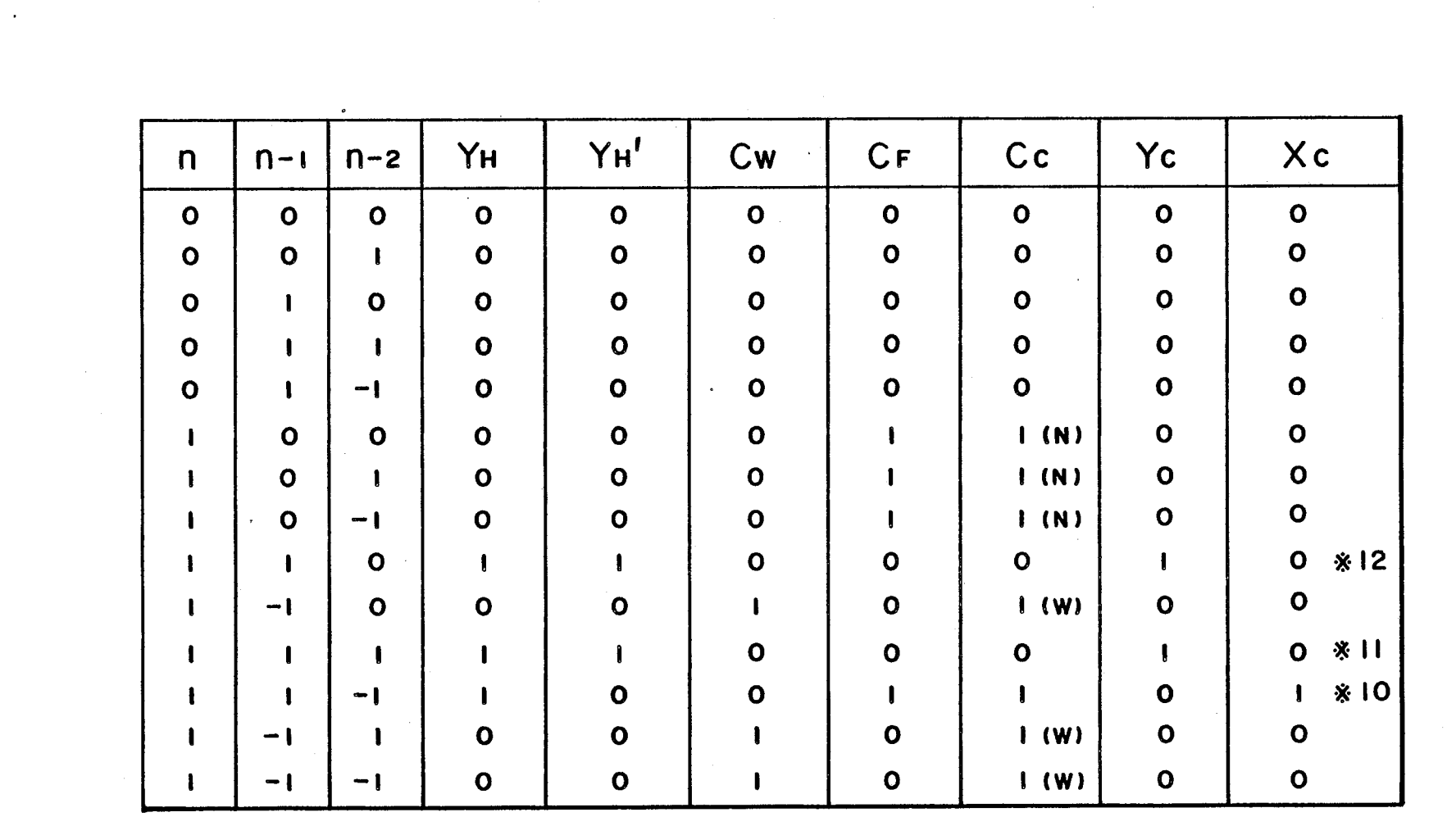

The truth table is shown in FIG. 16 for signal XC from the adder 76, signal CW from the adder 60, signal YH from the adder 61, signal YH′ from the subtracter 77, signal CF from the subtracter 64, signal CC from the adder 63, and potential signals for signal YC on lines n, (n−1) and (n−2).

Only for an image with color hues inverted in the screen vertical direction as shown in FIG. 14, the pattern thereof taking values of n=1, (n−1)=1, and (n−2)=−1 as shown at line *10 of FIG. 16, this embodiment outputs a signal XC=1, and outputs 0 for the other patterns. Therefore, for the patterns taking the same n=1, and (n−1)=1 but different (n−2)=0 or (n−2)=1 as shown at lines *11 and *12, CC=0 and YC=1 are outputted. As above, CC=1 and YC=0 are outputted only for the case of n=1, (n−1)=1, and (n−2)=−1, to thereby prevent generating dots at the boundary of color hues (YC=1) and losing color information (CC=1).

Although an additional 1H delay circuit is provided as compared with the circuit of FIG. 12, this delay circuit may be an inexpensive glass delay line commonly used in the art for passing only the color signal band, thus a cost increase is avoided. Since the two 1H delay circuits are provided at the luminance signal path, glass delay lines can be used for passing only the color signal band.

For an image such as color bars with vertical correlation of C signal, the circuit takes values "1" for signal n, "−1" for signal (n−1), "1" for signal CW from the adder 60, "0" for signal YH′ from the subtracter 77, and "0" for signal CF from the subtracter 64. Therefore, an output from the adder 63 takes a value of "1" so that a wide band color signal CW is outputted from the output terminal 4 as a wide band color signal CC (1(W)). An output "1" from the delay circuit 67 is subtracted by the CC signal "1" at the subtracter 68 to be outputted from the terminal 8 as the YC signal of "0".

For a random image such as an ordinary outdoor scenery without vertical correlation, it is considered signal n is "1" and signal (n−1) is "0" so that the circuit takes values "0" for signal CW from the adder, "0" for signal YH′ from the subtracter 77, and "1" for signal CF from the subtracter 64. Therefore, a narrow band signal CC (1(N)) of "1" is outputted from the narrow band-pass filter 65. Since signal CW is "0", the narrow band signal CC is outputted from the adder 63 to the output terminal 4. An output "1" from the delay circuit 67 is subtracted by the CC signal "1" at the subtracter so that the YC signal of "0" is outputted from the terminal 8.

As appreciated from the above, signal C with vertical correlation is processed via the wide band-pass filter to be outputted as a wide band C signal, thus eliminating cross luminance and improving the frequency characteristic of C signal for a color bar. On the other hand, signal C without vertical correlation is processed via the narrow band-pass filter to be outputted as a narrow band C signal, thus causing no shading of a fine image. Thus, an optimum bandwidth can be obtained depending upon whether there is vertical correlation or not.

Figure 17:
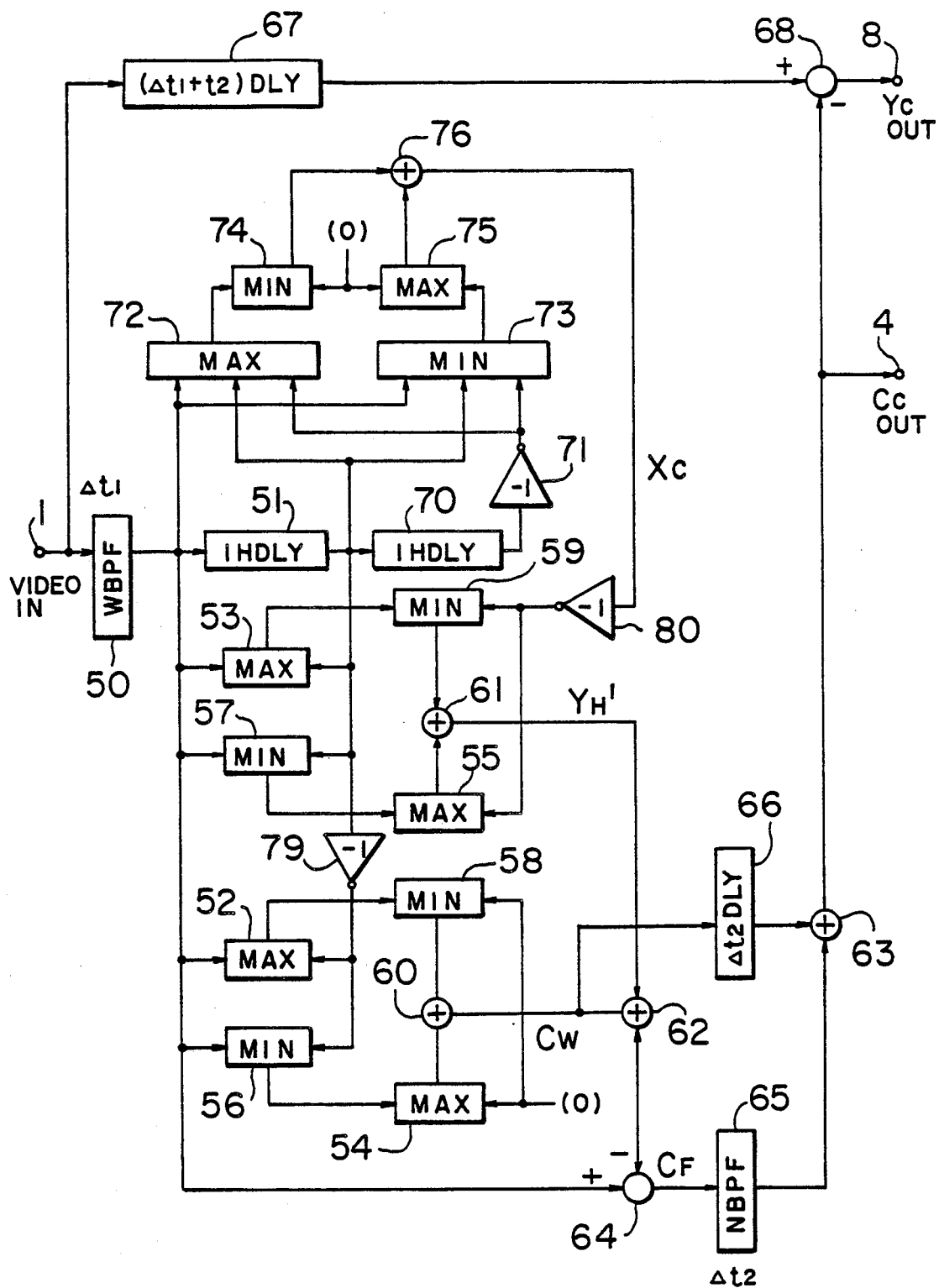
FIG. 17 is a block diagram of a third embodiment of the Yc separation circuit of this invention.

FIG. 17 is a block diagram showing a third embodiment (non-average type comb filter) of the YC separation circuit according to the present invention, wherein similar elements to those shown in FIGS. 12 and 15 are represented by using identical reference numerals and labels, and the description therefor is omitted. In this embodiment, an output XC from the adder 76 is iverted at an inverter 80 and supplied to MIN 59 and MAX 55. The same output as the signal YH′ from the subtracter 77 shown in FIG. 15 is obtained from the adder 61. The other operation and effect are similar to those described with FIG. 15.

Figure 18:
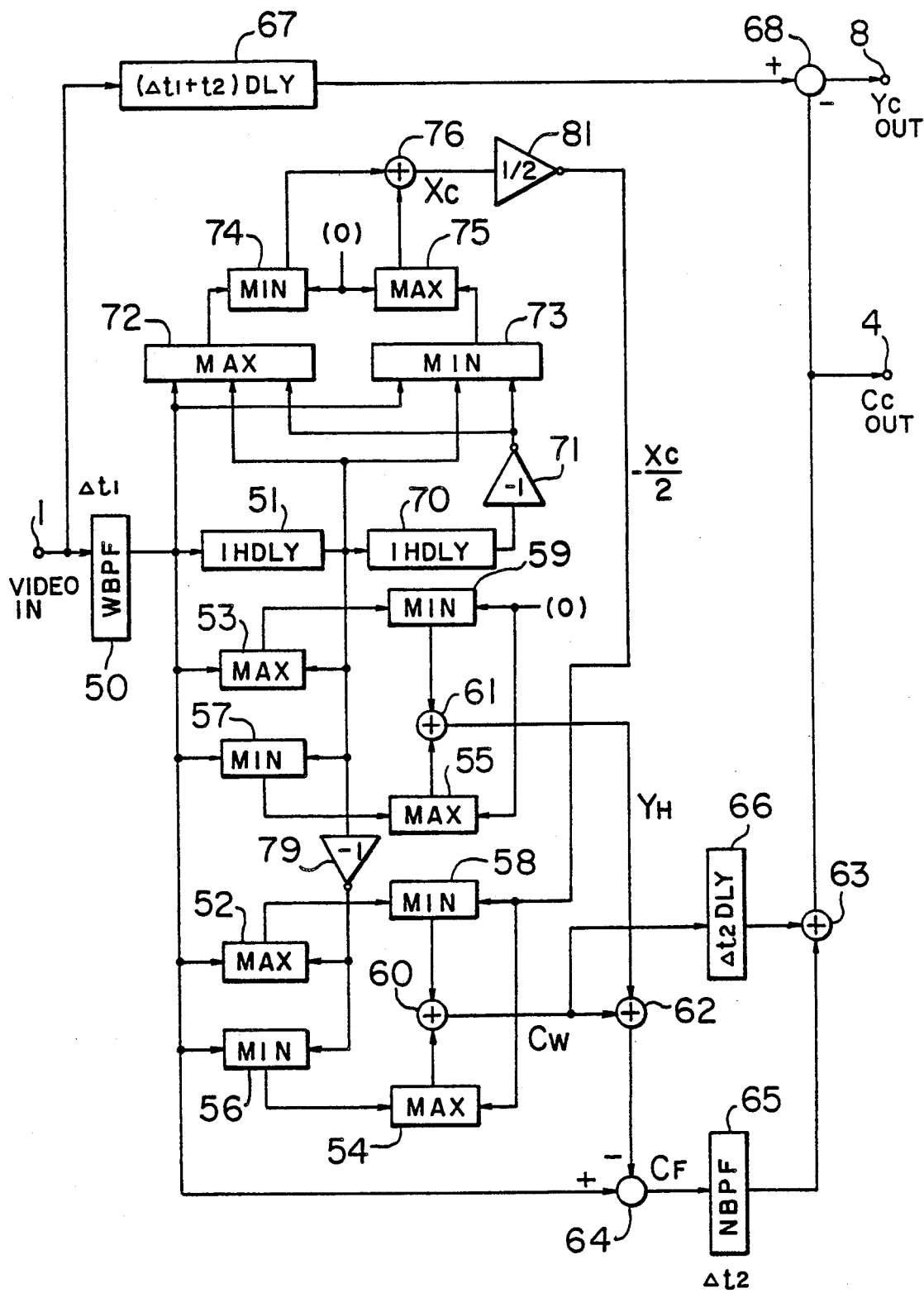
FIG. 18 is a block diagram of a fourth embodiment of the Yc separation circuit of this invention.

FIG. 18 is a block diagram showing a fourth embodiment (non-average type comb filter) of the YC separation circuit according to the present invention, wherein similar elements to those shown in FIGS. 12, 15 and 17 are represented by using identical reference numerals and labels, and the description therefor is omitted. In this embodiment, an output XC from the adder 76 is inverted at an inverter 81, divided by ½, and supplied to MIN 58 and MAX 54 to obtain an output CW from the adder 60. The other operation and effect are similar to those described with FIG. 15.

According to the above embodiment, dot crawl is not generated at the boundary between color hues inverted in the screen vertical direction, and color information is not lost. Furthermore, an optimum bandwidth can be obtained depending upon whether or not there is vertical correlation. Therefore, for an image with vertical correlation, cross luminance of color bars is eliminated, and the frequency characteristic of color signal can be improved. Alternatively for a fine image without vertical correlation, shading is not generated, and cross color is reduced because of a narrow color signal bandwidth. Furthermore, the circuit can be simplified and costs reduced.

Figure 19:
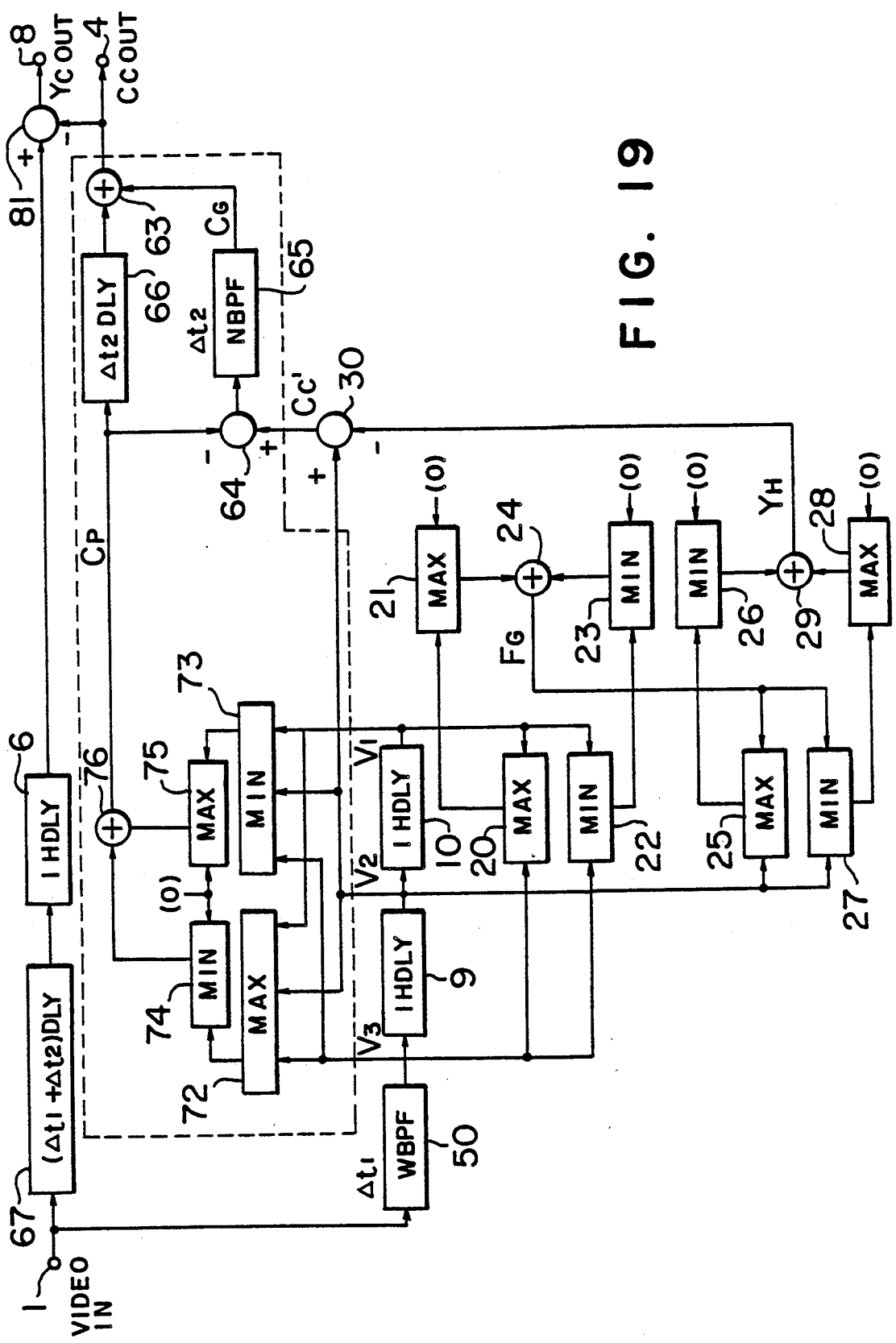
FIG. 19 is a block diagram of a fifth embodiment of the Yc separation circuit of this invention.

FIG. 19 is a block diagram showing a fifth embodiment of the YC separation circuit with the circuit arrangements shown in FIGS. 10 and 12 combined according to this invention, wherein similar elements to those shown in FIGS. 10 and 15 are represented by using identical reference numerals and labels, and the description therefor is omitted. The circuit portion other than that surrounded by a broken line in FIG. 19 is substantially the same as that shown in FIG. 10.

Referring to FIG. 19, a higher potential signal between signals V1 and V3 is picked up by MAX 20, and the signal is compared with zero by MAX 21 to pick up a higher potential signal therebetween. Similarly, a lower potential signal between signals V1 and V3 is picked up by MIN 22, and the signal is compared with zero to pick up a lower potential signal therebetween. The output signals from MIN 23 and MAX 21 are added together at an adder 24 to obtain a signal FG.

The signal FG is thus obtained by a first operation circuit whereby the signal takes a value having a larger absolute value when past and future line information have the same sign, and takes an algebraic sum of them when they have different signs.

A higher potential signal between signal V2 and signal FG is picked by MAX 25, and the signal is compared with zero by MIN 26 to obtain a lower potential signal therebetween. Similarly, a lower potential signal between signal V2 and signal FG is picked up by MIN 27, and the signal is compared with zero by MAX 28 to obtain a higher potential signal therebetween. The output signals from MAX 28 and MIN 26 are added together at an adder 29 to obtain a signal YH.

The signal YH is thus obtained by a second operation circuit whereby the signal takes a value having a smaller absolute value when the output from the first operation circuit and the current line information have the same sign, and takes a value equal to zero when they have different signs.

Signal V2 is subtracted by signal YH at a subtracter 30 constituting a third operation circuit to supply the result to a subtracter 64 as a signal CC'. Signals V1, V2 and V3 are supplied to MAX 72 and MIN 74 to pick up therefrom the highest and lowest potential signals. An output from MAX 72 is compared with 0 at MIN 74 to pick up a lower potential signal therebetween, whereas an output from MIN 73 is compared with 0 at MAX 75 to pick up a higher potential signal therebetween. The outputs from MIN 74 and MAX 75 are added together at an adder 76 to be supplied as a signal CP to the subtracter 64 and a Δt2 delay circuit 66.

An output from the subtracter 64 is passed through a narrow band-pass filter 65 and outputted as a signal CG (vertical transient chrominance signal) which is added to an output from the delay circuit 66 at an adder 63 to be outputted from an output terminal 4 as a signal CC. A composite image signal incoming to an input terminal 1 passes through a (Δt1+Δt2) delay circuit 67 for delay of a total delay time of the wide band-pass filter 50 and narrow band-pass filter 65, and through a 1H delay circuit 6 to be supplied to the subtracter 31 whereat it is subtracted by the CC signal and outputted from the output terminal as a YC signal.

The first operation circuit outputs a signal (FG) which takes a value having a larger absolute value when past and future line information from the wide band-pass filter have the same sign, and takes an algebraic sum of them when they have different signs. The second operation circuit outputs a signal (YH) which takes a value having a smaller absolute value when the output from the first operation circuit and the current line information have the same sign, and takes a value equal to zero when they have different signs. The third operation circuit obtains a color signal CC' by subtracting the output of the second operation circuit from the current line information. A fourth operation circuit outputs a signal (CP) which has a strongest vertical correlation among past, present and future line information signals. A fifth operation circuit outputs a color signal by adding the output CP from the fourth operation circuit to a signal (CG) which is obtained by subtracting an output signal of the fourth operation circuit from an output signal of the third operation circuit and by passing the result through the narrow band-pass filter.

For a pulse pattern of V1=V3=1 and V2=0, a signal CC of 0 level can be outputted thus eliminating cross color. For a pulse pattern of V1=V3=0 and V2=1, a signal CC of 1 level can be outputted thus eliminating shading. Further, for a flat pattern of V1=0, V2=1 and V3=1, and for a step pattern of V1=V2=1 and V3=0, a signal CC of 0 level can be outputted thus eliminating cross color at both the upper and lower ends of a screen and eliminating shading.

Figure 20:
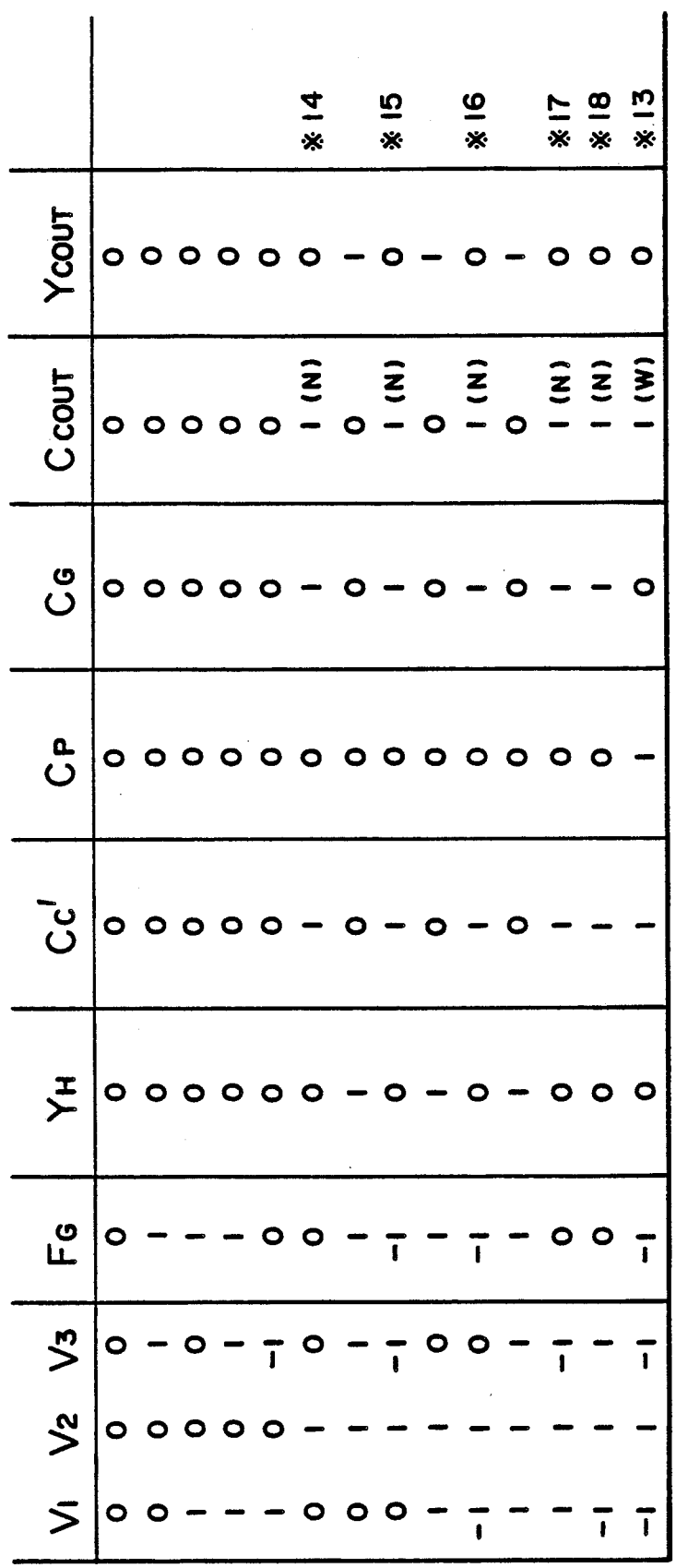
FIG. 20 illustrates signals obtained by the circuit shown in FIG. 19.

FIG. 20 is a truth table for signal CP (wide band C signal) from the wide band-pass filter 50 and the adder 76, signal FG, signal YH, signal CC' from the subtracter 30, signal CG from the narrow band-pass filter 65, and signals YC for respective potentials V1, V2 and V3.

For an image such as color bars with vertical correlation of C signal, as shown at line *13 of FIG. 20, the circuit takes values "−1" for signals V1 and V3, "1" for signal V2, "1" for signal CP from the adder 76, and "0" for signal YH from the adder 29. Therefore, signal CC' from the subtracter 30 becomes "1", signal from the subtracter 64 becomes "0", and signal CG becomes "0" so that a "1" signal CP is outputted from the output terminal 4 as a wide band color signal CC (1(W)). An output "1" from the 1H delay circuit 6 is subtracted by the CC signal "1" at the subtracter 31 to be outputted from the terminal 8 as the YC signal of "0".

For a random image such as an ordinary outdoor scenery without vertical correlation, as shown at lines *14 to 18 of FIG. 20, the circuit takes values as shown in FIG. 20 for signals V1 to V3, "0" for signal CP from the adder 72, "0" for signal YH' from the adder 29. Therefore, signal CC' from the subtracter 30 becomes "1", and an output signal from the subtracter 67 becomes "1" so that a narrow band signal CC (1(N)) of "1" is outputted from the narrow band-pass filter 65. Since signal CP is "0", the narrow band signal CC is outputted from the adder 63 to the output terminal 4. An output "1" from the delay circuit 6 is subtracted by the CC signal "1" at the subtracter 31 so that the YC signal of "0" is outputted from the terminal 8.

As appreciated from the above, signal C with vertical correlation is processed via the wide band-pass filter to be outputted as a wide band C signal, thus eliminating cross luminance and improving the frequency characteristic of C signal for color bars. On the other hand, signal C without vertical correlation is processed via the narrow band-pass filter to be outputted as a narrow band C signal, thus causing no shading of a fine image while reducing cross color. Thus, an optimum bandwidth can be obtained depending upon whether there is vertical correlation or not.

According to the above embodiment, in displaying vertically striped multi bursts with repeated white and black (step pattern), cross color at the upper and lower ends of a screen and shading of YC signal can be eliminated as opposed to the conventional circuit. Further, in displaying a pulse pattern, there is no cross color in CC signal and no shading in YC signal. Furthermore, an optimum bandwidth can be obtained depending upon whether vertical correlation is present or not. Therefore, for an image with vertical correlation, cross luminance for color bars is eliminated, and the frequency characteristic of color signal can be improved. Alternatively, for an image without vertical correlation, shading does not occur at a fine image to thus allow a high image quality.

The above embodiments have been applied to the NTSC system. However, the embodiments are also applicable to the PAL system if a 2H delay circuit is used instead of a 1H delay circuit.

Figure 21:
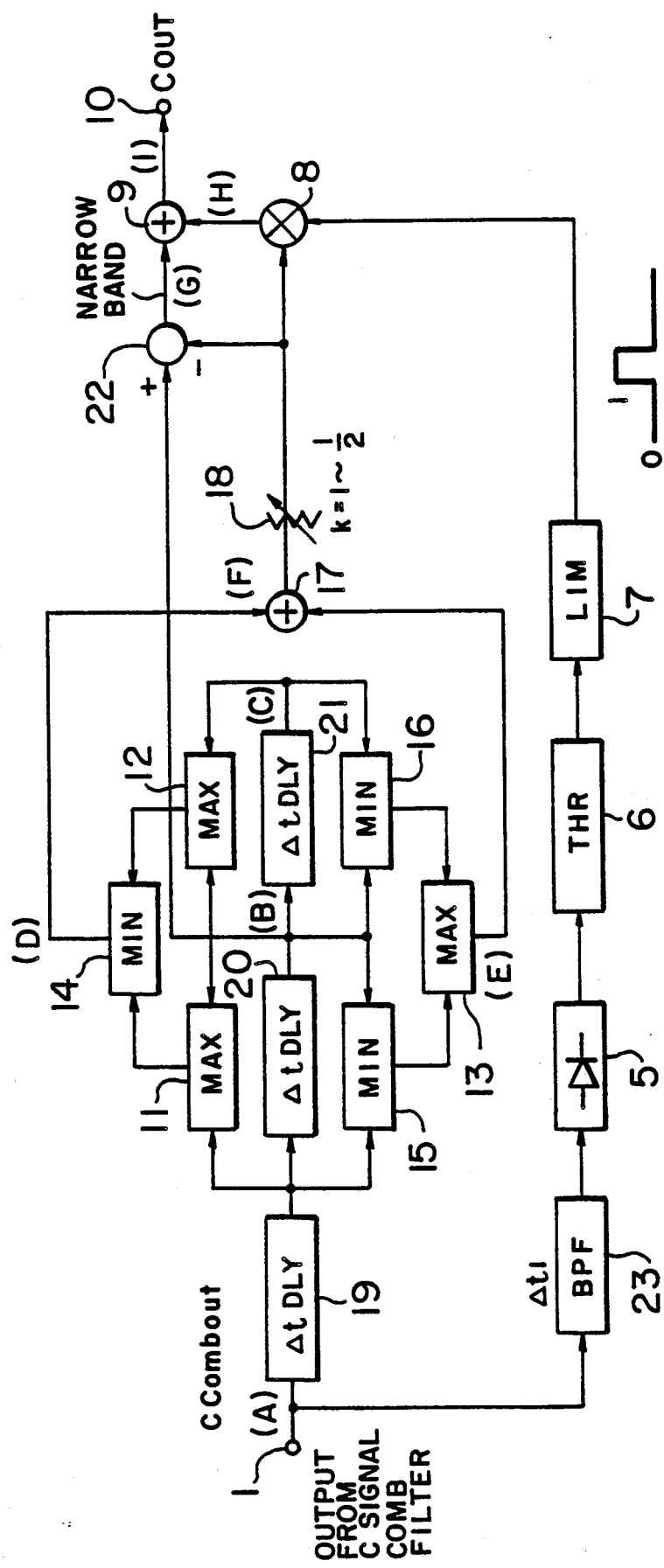
FIG. 21 is a block diagram showing a sixth embodiment of the Yc separation circuit of this invention.

FIG. 21 shows a further embodiment of this invention. Referring to FIG. 21, an output signal a (FIG. 22A) from a C signal comb filter incoming to an input terminal 1 (e.g., a striped C signal image on a screen which corresponds to a continuous sinewave) is supplied via a delay circuit 19 (with a delay time of $\Delta t1$ for matching a group delay characteristic) to a $\Delta t$ delay circuit 20 (with a delay time $\Delta t$ of $\frac{1}{2}$ fsc (sec) where fsc is a color sub-carrier frequency), to obtain a $\frac{1}{2}$ wavelength delayed signal b (FIG. 22B) which is supplied to MAXs 11 and 12 and MINs 15 and 16, and also to a $\Delta t$ delay circuit 21 to obtain a $\frac{1}{2}$ wavelength delayed signal c (FIG. 22C) which is supplied to MAX 12 and MIN 16. The outputs from MAXs 11 and 12 are supplied to MIN 14, whereas the output from MINs 15 and 16 are supplied to MAX 13.

MAXs 11, 12 and 13 have a circuit arrangement as shown in FIG. 4A for outputting a larger potential signal between the two signals inputted thereto, whereas MINs 14, 15 and 16 have a circuit arrangement as shown in FIG. 4B for outputting a smaller potential signal between the two signals inputted thereto.

Figure 22:
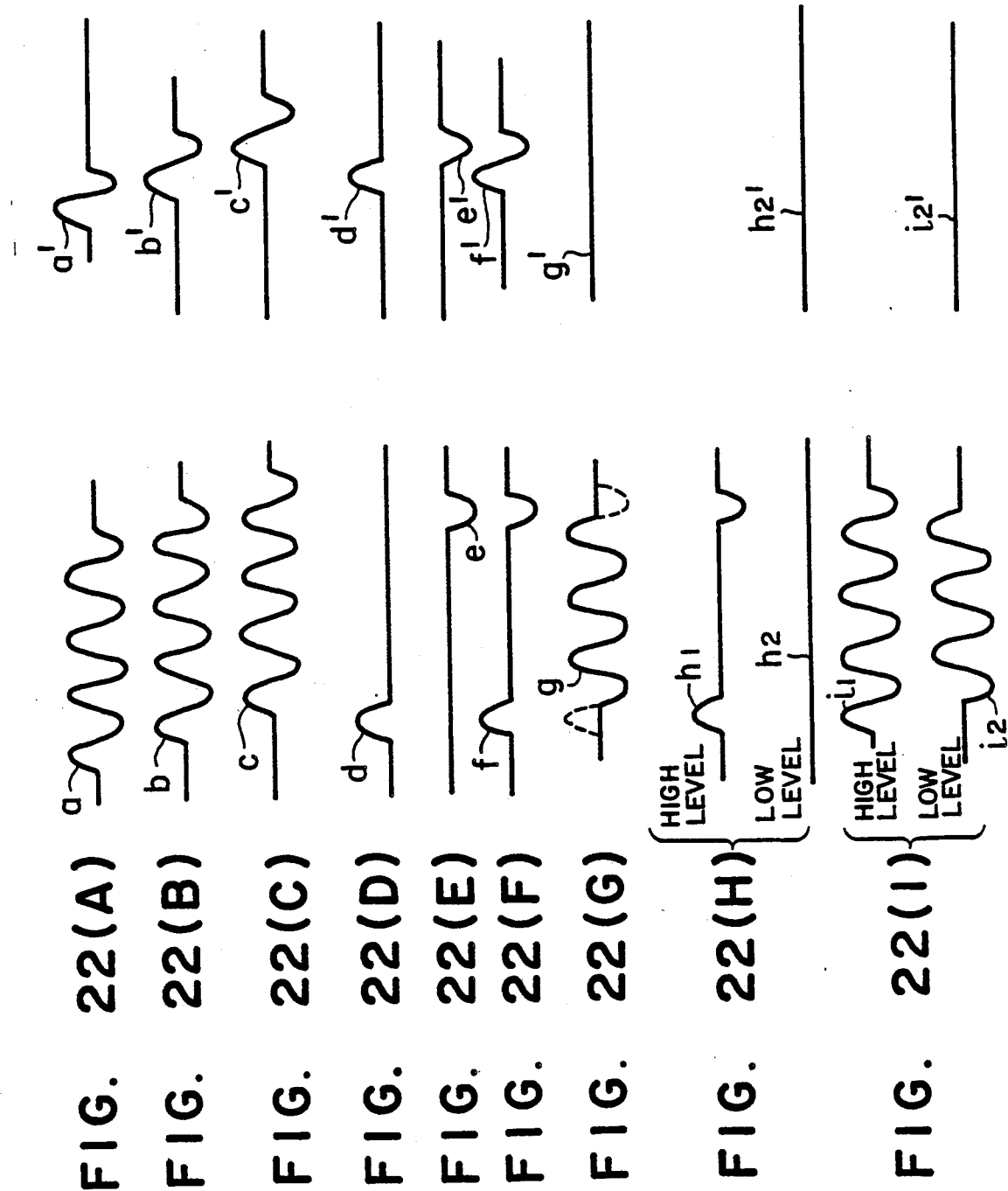
FIGS. 22A to 22I show waveforms used for explaining the operation of the circuit shown in FIG. 21.

The comparison result of the two signals at MIN 14 becomes a signal d (FIG. 22D), whereas the comparison result of the two signals at MAX 13 becomes a signal e (FIG. 22E). The signal d corresponds to the leading $\frac{1}{2}$ wavelength of the signal b, whereas the signal e corresponds to the trailing $\frac{1}{2}$ wavelength of the signal b. The signals d and e are added together at an adder 17 to obtain a signal f (FIG. 22F) which is supplied via an attenuator 18 having a constant k=1 for change of an amplitude from $\frac{1}{2}$ to 1, to a subtracter 22. The signal supplied to the subtracter is subtracted by the signal b from the $\Delta t$ delay circuit 20 to obtain a signal q (FIG. 22G). The signal q corresponds to the signal b with its leading $\frac{1}{2}$ wavelength and trailing $\frac{1}{2}$ wavelength removed therefrom (as indicated by broken lines). The signal f can be assumed substantially the same as the signal obtained through addition of signals a, b and c (each shifted by $\frac{1}{2}$ fsc) so that the frequency characteristic of the signal f is such that it takes 0 level at fsc, and 1 level at frequency 0 and at 2 fsc, with high levels at both opposite ends with respect to a center frequency of 3.58 MHz. Since the signal q is a subtraction result of the wide band signal b by the signal f, the signal q has a narrow band frequency characteristic with its center frequency of 3.58 MHz.

The signal a incoming at the terminal 1 is also supplied via a narrow band-pass filter 23 (with a delay time $\Delta t1$) to the circuit composed of a rectifier 5, threshold comparison circuit 6, and level limiter 7. Similar to the conventional circuit, this circuit outputs "1" signal when the level of the signal s from a C signal comb filter is large, whereas it outputs "0" signal when the level is small. The outputted signal is supplied to a multiplier 8. For a large level C signal, the signal f is multiplied by "1" and outputted as a signal h1 (FIG. 22H), whereas for a small level C signal the signal is multiplied by "0" and outputted as a 0 level signal h2 (FIG. 22H). These signals are added to the signal q at an adder 9. Therefore, for a large level C signal, a signal i1 (FIG. 22I) is outputted from the terminal 10 which signal is an addition of the signal f to the leading and trailing $\frac{1}{2}$ wavelengths of the signal q, and for a small level C signal, a signal i2 (FIG. 22I) is outputted and delivered to the terminal 10 which signal is the same waveform as that of the signal q.

A signal delivered to the terminal 10 is a signal i2 for a random image such as an ordinary outdoor scenery without vertical correlation (C signal level is lower than that of a color bar). Since the signal i2 corresponds to a narrow band signal q, there is less cross color. Further, since the signal i2 is a signal with the leading $\frac{1}{2}$ wavelength and trailing $\frac{1}{2}$ wavelength removed therefrom, there is less cross color at the contour of a screen. Alternatively, for an image such as color bars with vertical correlation (C signal level is large), a signal delivered to the terminal becomes a signal i1 which is a wide band signal.

Figure 1:
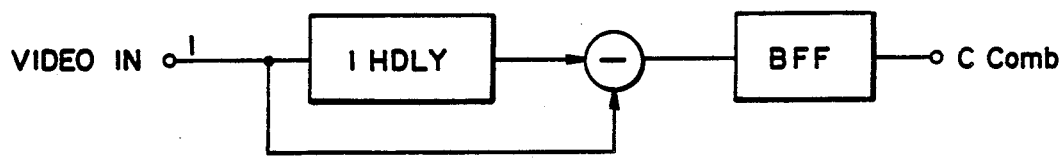
FIG. 1 is a circuit diagram showing a generally used C signal comb filter circuit.
Figure 2:
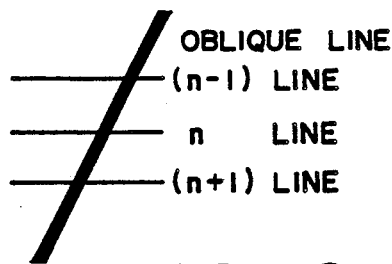
FIG. 2 illustrates an image of oblique lines.

Next, the operation when an oblique line signal (C signal level is small) as shown in FIG. 2 is applied to the circuit shown in FIG. 21 will be described. The circuit shown in FIG. 21 has two delay circuits 20 and 21 to obtain a one line before signal (n−1), a present line signal n, and a one line after signal (n+1), the low level present line signal n being obtained as an output signal.

Assuming that the output signal is a signal a' (FIG. 22A), then the outputs from the delay circuits 20 and 21 become a signal b' (FIG. 22B) and a signal c' (FIG. 22C), respectively, the outputs from MIN 14 and MAX 13 become a signal d' (FIG. 22D) and a signal e' (FIG. 22E), and the output from the adder 17 becomes a signal f' (FIG. 22F). The signal f' is substantially the same as the signal b'. The signal f' is supplied via the attenuator 18 (constant k=1) to the subtracter whereat it is subtracted by the signal b' to obtain a 0 level signal q' (FIG. 22G).

Since the level of C signal of the oblique line is small, the output from the limiter 7 becomes "0" and the output from the multiplier 8 becomes a 0 level signal h2' (FIG. 22H) which is added to the signal q' at the adder 9 to obtain a 0 level signal i2' (FIG. 22I). As above, even if C signal a' for the oblique line outputted (Y signal must essentially be outputted instead) because of insufficient YC separation performance of the C signal comb filter is applied, the present embodiment circuit operates to make the applied signal zero level. Therefore, there is no cross color (due to this, the image is unnecessarily colored as in the conventional circuit), and hence no shading.

The constant k of the attenuator is preferably ½ to 1 which was confirmed from the experiments.

Figure 23:
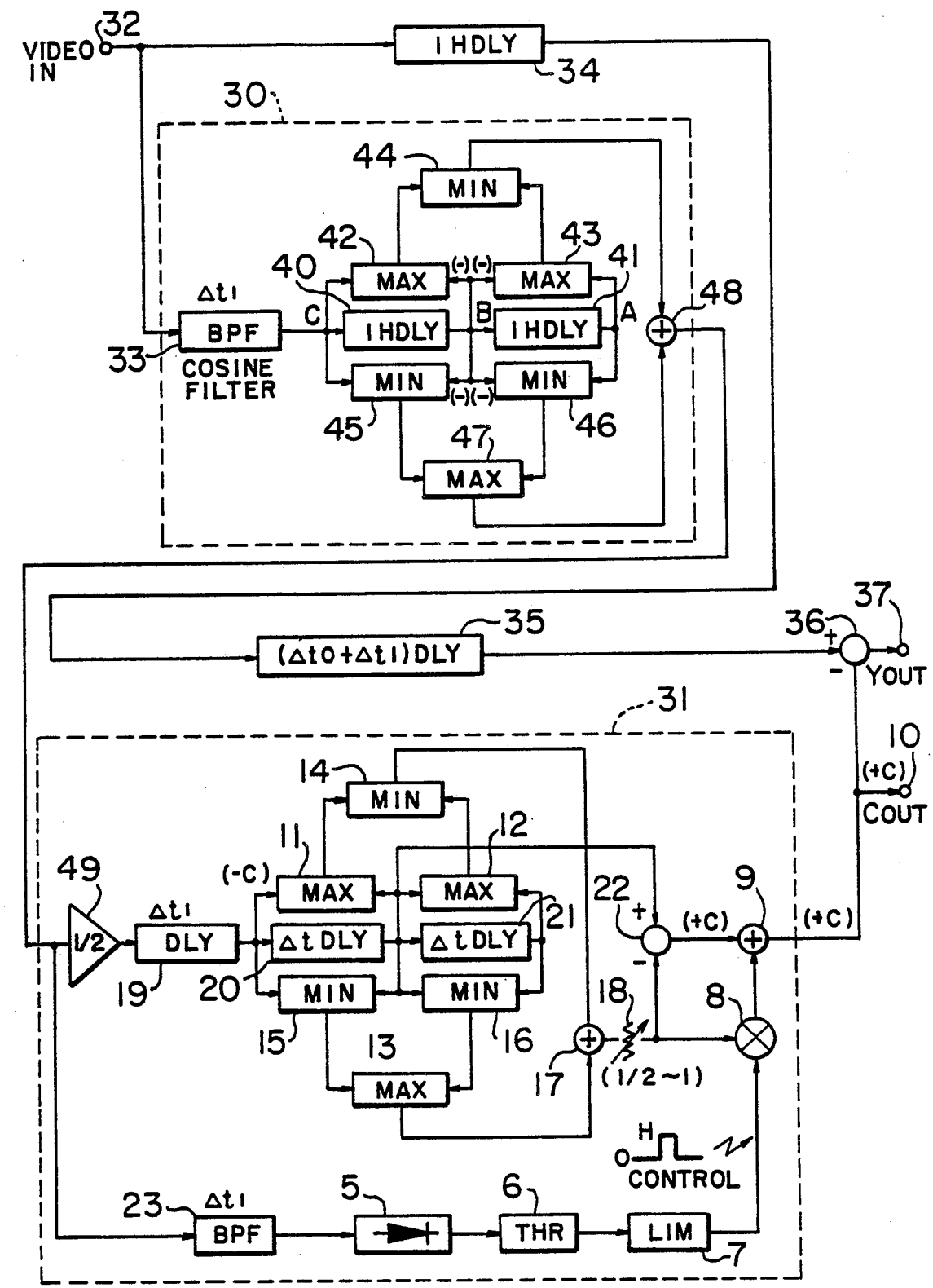
FIG. 23 is a block diagram showing a seventh embodiment of the Yc separation circuit of this invention.

FIG. 23 is a block diagram showing a still further embodiment wherein the NTSC system image signal processing circuit is added to the YC separation circuit. Referring to FIG. 23, reference numeral 30 represents a conventional known C signal comb filter, 31 the image signal processing circuit shown in FIG. 21, 32 a composite signal input terminal, 33 a wide band-pass filter having a delay time of $\Delta t0$ with a cosine filter arrangement, 34 a 1H delay circuit, 35 a delay circuit having a delay time of ($\Delta t0 + \Delta t1$), 36 an attenuator, and 37 a Y signal output terminal.

The input signal of the C signal comb filter 30 is represented by C (one line before) an output of the 1H delay circuit 40 is represented by B (present line), and an output of the 1H delay circuit 41 is represented by A (one line after). A higher potential signal between signals C and B is outputted from MAX 42, a higher potential signal between signals B and A is outputted from MAX 43, a lower potential signal X(+) between the outputs from MAX 42 and MAX 43 is outputted from MIN 44, where X(+)=MIN (MAX (C, B), MAX (B, C)). Similarly, MIN 45 outputs a lower potential signal between signals C and B, MIN 46 outputs a lower potential signal between signals B and A, and MAX 47 outputs a higher potential signal X(−) between the outputs from MIN 45 and MIN 46, where X(−)=MAX (C, B), MIN (B, C)). The signals X(+) and X(−) are added together at the adder 48 and divided by ½ at a ½ circuit 49 of the signal processing circuit 41 to obtain a signal CC=(X(+)+X(−))/2.

The output of the filter 30 is therefore represented by a formula (B+MID (A, B, C))/2 where MID (A, B, C) represents the second highest level signal among the three inputted signals A, B and C. Resultant CC signals for the four patterns shown in FIGS. 7A to 7D take values as indicated at the right side column.

A CC signal thus obtained is processed by the image signal processing circuit 31 and outputted from a terminal 10 as a C signal. A composite image signal incoming to a terminal 32 is supplied via a 1H delay circuit 34 and a ($\Delta t0 + \Delta t1$) delay circuit 35 to a subtracter 36 whereat it is subtracted by the C signal to obtain a Y signal which is outputted from a terminal 37.

Instead of the multiplier 8 shown in FIG. 21, a switch may be used. In this case, the switch is driven by the output from the threshold level circuit 17 such that the output from the adder 17 is obtained when the circuit 17 outputs "1", and a 0 level signal is obtained when the circuit 17 outputs "0". The limiter 7 is not necessary in this case.

The circuit shown in FIG. 23 is used for the NTSC system. However, the PAL system is also applicable if 2H delay circuits are used instead of the 1H delay circuits 40 and 41.

According to the above embodiment, the output signal from the C signal comb filter is subtracted by the output signal from the C signal with its leading and trailing ½ wavelengths being removed. The obtained signal is outputted for the case where the C signal comb filter output is small. The outputted signal becomes 0 for the case of a C signal for oblique lines (low level C signal) so that there is no cross color and hence no shading.

What is claimed is:

1. A luminance signal/color signal separation circuit comprising:
   a band-pass filter for picking up a color signal from a composite image signal;
   a delay circuit for sequentially delaying by one line said color signal picked up by said band-pass filter and obtaining three past, present and future line information;
   a first operation circuit for outputting a signal which takes a value having a larger absolute value when said past and future line information have the same sign, and takes an algebraic sum of said past and future line information when said past and future line information have different signs;
   a second operation circuit for outputting a signal which takes a value having a smaller absolute value when the output from said first operation circuit and said present line information have the same sign, and takes a reference value when said output from said first operation circuit and said present line information have different signs; and
   a third operation circuit for obtaining a color signal by subtracting the output of said second operation circuit from said present line information.

2. A luminance signal/color signal separation circuit according to claim 1,
   wherein said first operation circuit comprises:
   a first high potential output circuit for outputting a higher potential between said past and future line information;
   a first low potential output circuit for outputting a lower potential between said past and future line information;
   a second high potential output circuit for outputting a higher potential between the output from said first high potential output circuit and a reference potential;
   a second low potential output circuit for outputting a lower potential between the output from said first low potential output circuit and said reference potential; and
   an adder for adding together the outputs from said second high and low potential output circuits;
   and wherein said second operation circuit comprises:
   a third high potential output circuit for outputting a higher potential between said present line information and the output from said first operation circuit;
   a third low potential output circuit for outputting a lower potential between said present line information and the output from said first operation circuit;
   a fourth low potential output circuit for outputting a lower potential between the output from said third high potential output circuit and said reference potential;
   a fourth high potential output circuit for outputting a higher potential between the output from said third low potential output circuit and said reference potential; and
   a second adder for adding together the outputs from said fourth low and high potential output circuits.

3. A luminance signal/color signal separation circuit comprising:
   a wide band-pass filter for picking up a color signal from a composite image signal;
   a delay circuit for sequentially delaying by one line said color signal picked up by said wide band-pass filter and obtaining three past, present and future line information;

a first operation circuit for outputting a signal which takes a value having a larger absolute value when said past and future line information have the same sign, and takes an algebraic sum of said past and future line information when said past and future line information have different signs;

a second operation circuit for outputting a signal which takes a value having a smaller absolute value when the output from said first operation circuit and said present line information have the same sign, and takes a reference value when said output from said first operation circuit and said present line information have different signs;

a third operation circuit for obtaining a color signal by subtracting the output of said second operation circuit from said present line information;

a fourth operation circuit for detecting a signal having a strongest vertical correlation among said past, present and future line information; and a fifth operation circuit for outputting a color signal by adding the output of said fourth operation circuit to a signal which is obtained by subtracting the output of said fourth operation circuit from the output from said third operation circuit and by passing the result through a narrow band-pass filter.

4. A luminance signal/color signal separation circuit according to claim 3, wherein said first operation circuit comprises:

a first high potential output circuit for outputting a higher potential between said past and future line information;

a first low potential output circuit for outputting a lower potential between said past and future line information;

a second high potential output circuit for outputting a higher potential between the output from said first high potential output circuit and a reference potential;

a second low potential output circuit for outputting a lower potential between the output from said first low potential output circuit and said reference potential; and an adder for adding together the outputs from said second high and low potential output circuits;

and wherein said second operation circuit comprises:

a third high potential output circuit for outputting a higher potential between said present line information and the output from said first operation circuit;

a third low potential output circuit for outputting a lower potential between said present line information and the output from said first operation circuit;

a fourth low potential output circuit for outputting a lower potential between the output from said third high potential output circuit and said reference potential;

a fourth high potential output circuit for outputting a higher potential between the output from said third low potential output circuit and said reference potential; and a second adder for adding together the outputs from said fourth low and high potential output circuits.

5. A luminance signal/color signal separation circuit according to claim 3, wherein said fourth operation circuit comprises:

a first high potential output circuit for outputting a highest potential among said past, present and future line information;

a first low potential output circuit for outputting a lowest potential among said past, present and future line information;

a second low potential output circuit for outputting a lower potential between the output from said fifth high potential output circuit and a reference potential;

a second high potential output circuit for outputting a higher potential between the output from said fifth low potential output circuit and said reference potential; and a first adder for adding together the outputs from said sixth low and high potential output circuits.

6. An image signal processing circuit comprising:

a wide band-pass filter for obtaining a color signal by separating a composite image signal;

a circuit for obtaining, from a present line signal outputted from said wide band-pass filter, an N (N=1, 2, ... ) line before signal, and a 2N line before signal;

a first operation circuit for detecting a signal of an image whose color hues are inverted in the vertical direction of a screen from the output from said wide band-pass filter, N line before signal, and 2N line before signal; and a second operation circuit for detecting if there is vertical correlation or not based on the output from said wide band-pass filter, N line before signal, and the output from said first operation circuit, picking up said color signal to have a wide band if there is vertical correlation, picking up said color signal to have a narrow band if there is no vertical correlation, and at least for an image whose color hues are inverted in the vertical direction of a screen, picking up said color signal to have "1" level and a luminance signal to have "0" level.

7. An image signal processing circuit comprising:

a ½ wavelength signal output circuit for picking up a leading ½ wavelength signal and trailing ½ wavelength signal from a carrier color signal derived from a composite image signal by a carrier color signal comb filter;

a subtracter circuit for subtracting the output of said ½ wavelength signal output circuit from said carrier color signal picked up by said carrier color signal comb filter; and a selector circuit for detecting a level of said carrier color signal picked up by said carrier color signal comb filter, adding the output from said ½ wavelength signal output circuit to the output from said subtracter circuit when said level is large, and outputting the output per se from said subtracter circuit when said level is small.

* * * * *